US008392828B2

(12) United States Patent
Yoo et al.

(10) Patent No.: US 8,392,828 B2
(45) Date of Patent: Mar. 5, 2013

(54) OPEN THEME BUILDER AND API

(75) Inventors: Frank Yoo, San Francisco, CA (US);
Shannyn Timrott, Milpitas, CA (US);
Paul Thurlow, San Francisco, CA (US);
Prasanna Padmanabhan, Sunnyvale,
CA (US); James Kittock, Menlo Park,
CA (US); Luke Wroblewski, San Jose,
CA (US); Kent Brewster, E. Palo Alto,
CA (US)

(73) Assignee: Yahoo! Inc., Sunnyvale, CA (US)

( * ) Notice: Subject to any disclaimer, the term of this patent is extended or adjusted under 35 U.S.C. 154(b) by 570 days.

(21) Appl. No.: 12/454,653

(22) Filed: May 20, 2009

(65) Prior Publication Data

US 2010/0299586 A1    Nov. 25, 2010

(51) Int. Cl.
*G06F 17/22* (2006.01)
*G06F 3/00* (2006.01)
*G06F 3/048* (2006.01)

(52) U.S. Cl. .......................... 715/255; 715/762; 715/763

(58) Field of Classification Search .................. 715/255, 715/762, 763
See application file for complete search history.

(56) References Cited

U.S. PATENT DOCUMENTS

| 6,822,663 | B2 * | 11/2004 | Wang et al. .................. 715/854 |
| 6,826,727 | B1 * | 11/2004 | Mohr et al. .................. 715/235 |
| 7,281,018 | B1 * | 10/2007 | Begun et al. ........................ 1/1 |
| 7,475,337 | B1 * | 1/2009 | Huang .......................... 715/234 |
| 7,698,631 | B1 * | 4/2010 | Toebes .......................... 715/234 |
| 7,802,203 | B2 * | 9/2010 | Danninger .................... 715/841 |
| 7,809,858 | B1 * | 10/2010 | Brown .......................... 709/245 |
| 2002/0116418 | A1 * | 8/2002 | Lachhwani et al. .......... 707/517 |
| 2002/0147748 | A1 * | 10/2002 | Huang et al. ................. 707/517 |
| 2003/0221162 | A1 * | 11/2003 | Sridhar ....................... 715/501.1 |
| 2003/0233620 | A1 * | 12/2003 | Vedullapalli et al. ......... 715/522 |
| 2004/0113930 | A1 * | 6/2004 | Hawley et al. ................ 345/700 |
| 2004/0205513 | A1 * | 10/2004 | Chen et al. .................. 715/501.1 |
| 2006/0095252 | A1 * | 5/2006 | Takagi et al. .................. 704/200 |
| 2006/0236254 | A1 * | 10/2006 | Mateescu et al. ............. 715/762 |
| 2006/0282771 | A1 * | 12/2006 | Vinci .......................... 715/530 |
| 2009/0006454 | A1 * | 1/2009 | Zarzar et al. .................. 707/102 |
| 2009/0006996 | A1 * | 1/2009 | Saha et al. .................... 715/765 |
| 2009/0031228 | A1 * | 1/2009 | Buchs et al. .................. 715/764 |
| 2009/0265615 | A1 * | 10/2009 | Hatori et al. .................. 715/239 |

(Continued)

OTHER PUBLICATIONS

Reif et al., "WEESA—Web Engineering for Semantic Web Applications", ACM, 2005, pp. 722-729.*
Tan et al, "Research and Implement of Tree Structure Based Graphic User Interface Editor", 2008, IEEE, pp. 859-862.*

*Primary Examiner* — Doug Hutton, Jr.
*Assistant Examiner* — Soumya Dasgupta
(74) *Attorney, Agent, or Firm* — Martine Penilla Group, LLP

(57) ABSTRACT

Methods and system for customizing a webpage include generating a schematic representation of the webpage wherein the webpage includes a plurality of section elements that are customizable. The schematic representation identifies a plurality of schematic section elements corresponding to the plurality of section elements of the webpage. The schematic representation is rendered for the webpage and provides visual navigation through various section elements of the webpage. A schematic section element is selected from the schematic representation, for customizing. The selection of the schematic section element triggers rendering of respective one or more navigation links, which provide tools or options for customization. Changes representing customization to one or more attributes associated with the selected schematic section element are received and the attributes are updated at the schematic representation in real-time. The changes are cascaded to the corresponding section elements of the webpage in substantial real-time based on user interaction.

22 Claims, 10 Drawing Sheets

U.S. PATENT DOCUMENTS

2009/0313352 A1* 12/2009 Dupont .................. 709/219
2010/0251143 A1* 9/2010 Thomas et al. ............ 715/760
2010/0313112 A1* 12/2010 Hardt .................... 715/226
2011/0252305 A1* 10/2011 Tschani et al. ............ 715/234

* cited by examiner

OPEN THEME BUILDER AND API

BACKGROUND

1. Field of the Invention

The present invention relates to customizing webpages, and more particularly, to providing a theme builder for building multiple themes that are used for customizing the webpages.

2. Description of the Related Art

Webpage has evolved over the years. Current webpage integrates and renders a plurality of contents of varied forms and formats. A well designed webpage defines a user's taste and interest. The content, style and presentation of the webpage convey the standards of the designer. Most of the webpages designed by users use pre-defined templates and design tools. The customizations provided by these tools are mostly "provider-side" customizations. The pre-defined templates and design tools offer high resolution design options for the webpage and cover an array of themes. All the design elements, color schemes, fonts, background and other webpage elements are pre-defined. A user with no expertise or experience in designing can use any of the pre-defined templates when designing his/her webpage. However, these pre-defined templates and design tools provide very limited customization and very limited control on customization of the webpage. Some of the tools provide the ability to customize the content of the webpage but do not provide the ability to change the appearance and color scheme of the webpage. Some other tools provide the ability to change the look and feel of the webpage but do not provide the ability to save the changes for subsequent rendering.

When a user desires to change the look-and-feel of the webpage, he/she may use the limited options available within a predefined template or may have to manipulate the code that defines the webpage to include the desired changes. In the case where the user has to manipulate the code, the user has to be adept at manipulating the software code in order to perform the customization or engage a professional developer to perform the customization. This type of customization is time consuming and costly.

In addition to provider-side customization tools, some other tools provide client-side customization. The tools for client-side customization provide limited control in changing the content as well as the look-and-feel of the webpage and the changes are rendered on the webpage as one or more features are being changed. However, these changes are temporary as the client-side tools do not provide the ability to save customized features for subsequent rendering. Additionally, both the provider-side and the client-side customization tools do not provide the option of defining multiple customization schemes for a webpage. Defining different customization schemes for different occasions or scenarios and providing the ability to save the customization of the webpage for subsequent retrievals provides greater control and flexibility to the user thereby enriching the user's web experience.

The conventional provider-side and client-side customization tools do not provide the ability to share, import, or export the customization. In some instances, the changes are stored locally at the client in a local buffer that is session specific and are deleted when the user quits the session. Due to such restraints, the conventional customization tools are impractical.

It is in this context that the embodiments of the invention arise.

SUMMARY

Embodiments of the present invention provide methods and system for customizing a webpage. A schematic representation of the webpage is generated and rendered alongside the webpage. The schematic representation identifies the schematic section elements that correspond to a plurality of section elements that define the webpage and provides visual navigation through the various section elements of the webpage. Each of the schematic section elements is defined by one or more elements with each element further defined by one or more attributes. A schematic section element is selected from the plurality of schematic section elements of the schematic representation for customization. Changes to one or more attributes associated with the selected schematic section element are received at the schematic representation. The changes identify the customization to the selected schematic section element. The changes to the attributes of the selected schematic section element are updated at the schematic representation in real time. The changes to the attributes are cascaded to the relevant section elements of the webpage rendered alongside the schematic representation based on user interaction.

The embodiments of the present invention provide greater control to the user during the customization of a webpage. The embodiments allow the changes to be first applied to a schematic representation, enable preview of the changes and fine-tuning the changes at the schematic representation prior to the actual application of the changes to the webpage. The changes are applied in real-time and are saved simultaneously for subsequent retrieval. The schematic representation provides a mini map to the webpage identifying the various schematic section elements corresponding to section elements of the webpage that are customizable. The changes can be shared through actual exchange of code that make up the webpage or through a uniform resource locator (URL), importing or exporting options.

It should be appreciated that the present invention can be implemented in numerous ways, such as, methods, a system and an apparatus. Several inventive embodiments of the present invention are described below.

In one embodiment, a method for customizing a webpage is disclosed. The method includes generating a schematic representation of the webpage. The webpage includes a plurality of content modules to render different content forms and each of the content modules has a plurality of section elements that are customizable. The schematic representation identifies a plurality of schematic section elements corresponding to the plurality of section elements of the webpage. The schematic representation is rendered alongside the webpage and provides visual navigation through various section elements of the webpage. A schematic section element is identified and selected from the schematic representation, for customizing. The selection of the schematic section element triggers rendering of one or more navigation links associated with the selected schematic section element. The navigation links provide tools or options enabling customization. Changes to one or more attributes associated with the selected schematic section element representing customization are received and the attributes are updated at the schematic representation in real-time. The changes are cascaded to the corresponding section elements of the webpage in substantial real-time based on user interaction.

In another embodiment, a theme-builder algorithm is disclosed. The theme-builder algorithm includes code which when executed by a server allows for customizing a webpage. The algorithm includes a schematic user interface to generate a schematic representation of the webpage. The webpage includes a plurality of content modules with each of the content modules having a plurality of section elements with each section element having a plurality of elements with each element defined by one or more attributes. The schematic representation provides for visual navigation through the plurality of section elements of the webpage. The algorithm also includes a customizer logic for customizing one or more of the plurality of schematic section elements by manipulating one or more attributes that define the schematic section element. The customization performed at the schematic section element is cascaded to one or more section elements of the webpage based on user interaction and the changes to the section elements are stored for subsequent retrieval. The algorithm further includes an open theme application programming interface (OAPI) to share the customized webpage with other users.

In yet another embodiment of the invention, a method for providing customization of a webpage is disclosed. The method includes rendering a navigation link list with a plurality of navigation links alongside the webpage. The webpage includes a plurality of section elements with each section element having a plurality of elements. Each element of the webpage is defined by a plurality of attributes. The navigation link provides navigation to one or more tools and options that aid in the customization of the webpage. A navigation link is selected from the navigation link list for performing the customization. The selection of the navigation link triggers rendering of one or more of options, tools, additional navigation links associated with the selected navigation link so as to enable modifying one or more attributes of an element in the webpage during customization. One or more modification to one or more attributes associated with the element is received at the webpage as part of customization. The modifications are cascaded to related elements of the webpage in substantial real time based on user interaction.

The embodiments of the invention provide an alternate way to customize a webpage. The schematic representation acts as a minimap for the webpage identifying various section elements of the webpage. The navigation links rendered alongside the schematic representation correspond to selected section element and provide greater control and flexibility during customization. The application of the customization to one or more schematic section elements of the schematic representation in real-time enables visualization of the customization and the customization algorithm enables further fine-tuning thereby providing an effective tool that allows greater flexibility and control to the user during customization of the webpage. Further, when the changes are saved for subsequent retrieval, the code defining the webpage is updated to reflect the change at the webpage. The algorithm, thus, provides an alternate way to update the code to include the customized features without direct manipulation of the code. Alternate embodiments allow for direct code manipulation during customization while retaining the ability to indirectly update the code through the theme-builder algorithm.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
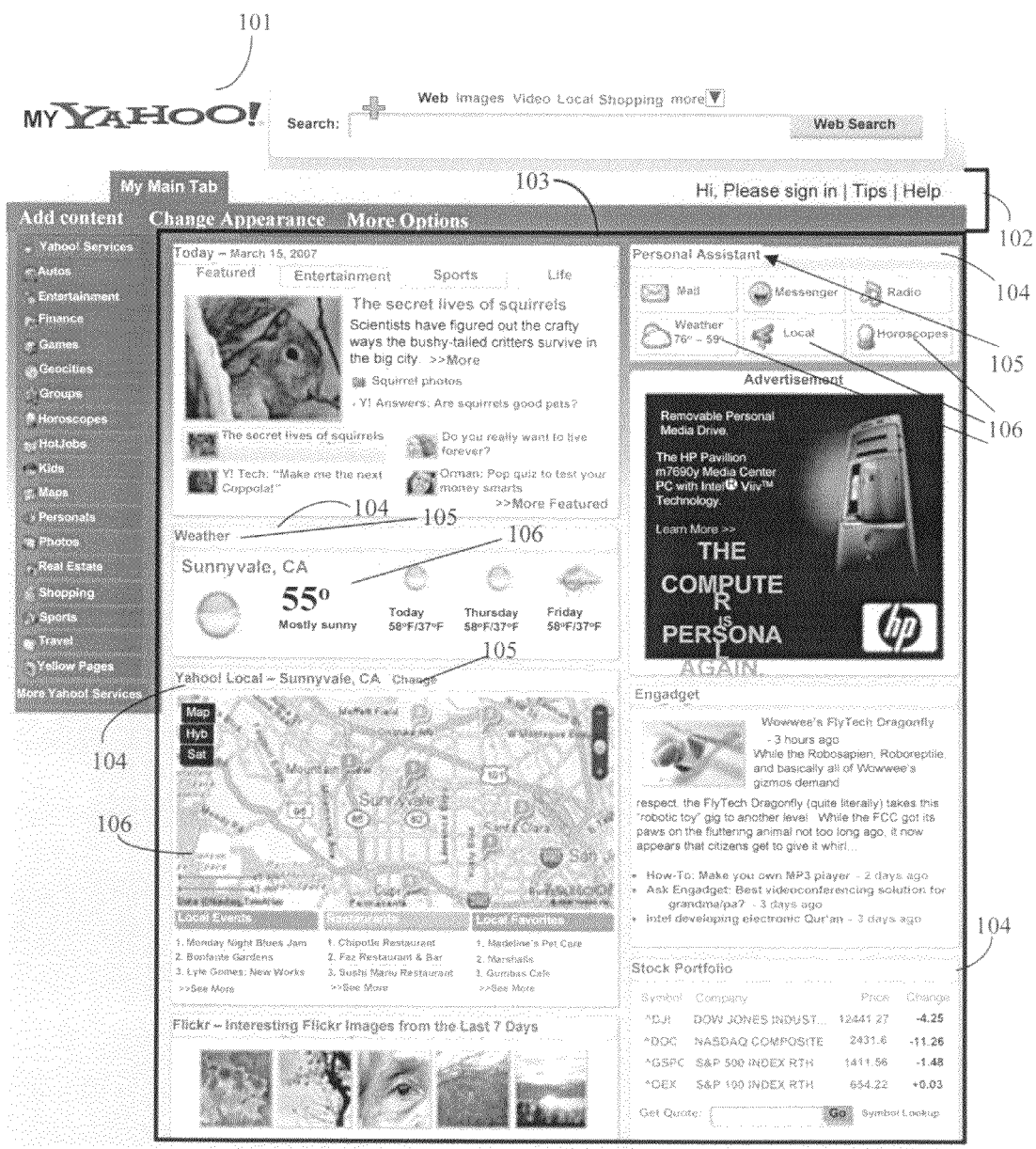
FIG. 1 illustrates a sample webpage depicting various components that is used for customization, in one embodiment of the invention.

Broadly speaking, the embodiments of the present invention provide methods and systems for customizing a webpage. The methods and system include generating a schematic representation of the webpage. The schematic representation identifies a plurality of schematic section elements that correspond to a plurality of section elements defining the webpage. The webpage is made of a plurality of content modules with each content module rendering unique content of similar or varying format. Each of the content modules also includes a plurality of section elements similar to the section elements of the webpage. Each of the section elements and, consequently, each of the schematic section elements are defined by a plurality of elements with each element defined by a plurality of attributes. A schematic section element is selected from the schematic representation for customization. The selection of the schematic section element for customization triggers identification and rendering of one or more navigation links associated with the selected schematic section element alongside the schematic representation of the webpage. The navigation links provide one or more of customization tools and options for customizing the one or more attributes defining the selected schematic section element. The changes to the attributes are rendered at the selected schematic section element in real-time and are cascaded to the corresponding section element of the webpage in substantial real-time based on user interaction. Further, the code defining the webpage is automatically updated with the updated attributes representing customization to the selected section element for subsequent rendering and for sharing with other users.

The methods and algorithm (tool) provide a way that enables users to customize the webpage while providing the users with greater control and flexibility in the customization. The changes are applied in substantial real time allowing the users to view the changes and to further refine the changes, if needed. The tool is optimized for both a novice user for lightweight personalization and a power user who wants to completely customize each element of the webpage as well as build his/her own application and apply the changes. Thus, a lightweight user does not have to tamper with any source code for the webpage. Instead, with little time and effort, the user can substantially customize his/her webpage, save and share the customizations using a user interface within the tool. A power user who wants to change every aspect of the webpage from color to background images to the small control icons within the content module headers can do so using a Open theme application programming interface (OAPI) available to the tool. The tool, thus, provides a seamless but effective way of managing customization while providing greater sense of ownership and control of the look and feel of the webpage for all types of users. The webpage may be locally generated webpage or may be imported from other sources and may or may not include some form of customization by other users. Irrespective of the source or the amount of customization performed at the webpage, the embodiments provide the ability to further customize the webpage and share the customized webpage with other users making this a simple but an effective tool for customization. The substantial real-time visual rendering of customized features at the schematic representation enables a user to determine the effectiveness of the customization prior to actual commitment at the webpage. Additional features and functions enable for better customization of the webpage, making this a more effective tool of customization that engages a user's interest.

It should be understood that the features of the embodiments may be in the form of a customization algorithm with logic instructions that can be stored on a computer readable medium and executed on a computer system. Alternately, the customization algorithm may be available to the computer system but does not have to be integrally coupled to the computer system. Towards this end, the various features and functionalities of the current embodiments will now be described in detail with reference to the drawings.

FIG. 1 illustrates a sample webpage identifying various components, including section elements and elements that can be customized using the customization algorithm, in one embodiment of the invention. The webpage includes a plurality of section elements including a page header section 101, a navigation bar section 102, and a content module section 103. The content module section 103, in turn, includes a plurality of content modules 104. Each of the content modules includes a content header section 105 and a content application section 106. Each of the section elements, in turn, is made up of one or more elements. In one embodiment, the content header section 105 is made up of a text element and a background element. The content application section 106, in one embodiment, is made up of one or more of a text element, one or more link elements, one or more visited link elements and a background color element. Similarly, the navigation bar section element 102 may include one or more of an active tab text element, inactive tab text element, navigation bar element and inactive tab element. Each element can be defined using one or more attributes, such as background color, text size, text style, text color (where applicable). The sample webpage described herein is exemplary and should not be considered restrictive. Other formats of the webpage may also be considered.

Figure 2:
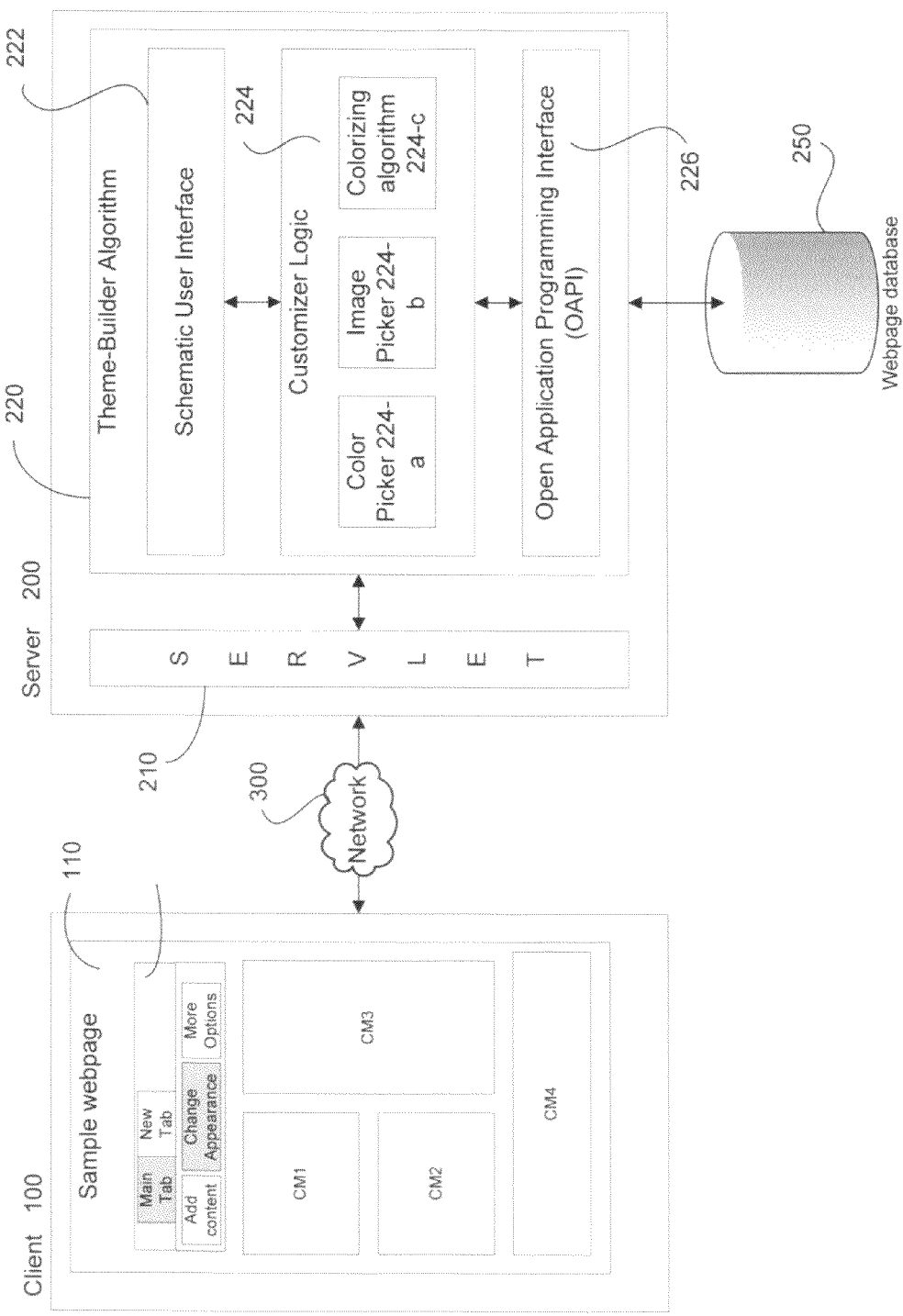
FIG. 2 illustrates a simplified schematic representation of a system with an open theme-builder algorithm available on a server for customizing webpage, in one embodiment of the invention.

FIG. 2 illustrates a simplified representation of a computer system with an open theme-builder algorithm for customizing a webpage, in one embodiment of the invention. The system includes a client device 100 for requesting and rendering a webpage. The webpage may be generated at the client device 100 or may be obtained from an internal or external source. A display device at the client device 100 renders the requested or generated webpage. The webpage includes a plurality of content modules with each content module rendering distinct content of similar or varied format. The webpage and each of the content modules include a plurality of section elements with each section element made up of one or more elements. A navigation bar 102 (illustrated in FIG. 1) on the webpage includes plurality of navigation links that allow customization of the webpage. The customization of a webpage includes addition or deletion of contents, changing the look and feel of the webpage and other options that enable a user to customize the webpage to one's taste and liking. Towards this end, the navigation links, in one embodiment, may include an "Add Content" link, a "Change Appearance" link and an "Other Option" link. It should be understood that the above list of navigation links is exemplary and is not to be considered restrictive. As a result, other types of links that aid in the customization of the webpage may also be considered.

The client is connected to a server 200 over a network, 300, such as an internet. The server 200 receives requests for webpage or content from the client 100 and provides relevant information in response to the request through a servlet 210 on the server 200. An open theme-builder algorithm 220 is available at the server 200 for allowing customization of the webpage rendered on the client 100. The open theme-builder algorithm 220 includes a plurality of modules that aid in the customization. Specifically, the open theme-builder algorithm 220 includes a schematic user interface (SUI) 222 to provide a plurality of navigation links that can be used for customizing the webpage and a customizer logic 224 to provide additional tools for customization. An open application programming interface (OAPI) 226 is available to the theme builder algorithm 220 to allow customized webpage to be shared with other users. The OAPI 226 may be integrated with the theme builder algorithm 220 or may be stand-alone but interact with the theme builder algorithm. The OAPI 226 provides the interface to receive as well as share customized webpages with other users. The customization to the webpage may be updated to a backend database, such as a webpage database 250, available to the SUI 222 so that the changes can be shared with other users. In one embodiment, the theme-builder algorithm 220 may be provided as computer executable instructions on a computer readable medium which can be executed by the server of the computer system. Thus, the customizations performed to the webpage are portable across the network 300 through the OAPI so that other users may be able to enjoy and enhance the customized webpage resulting in increased user engagement.

Figure 3A:
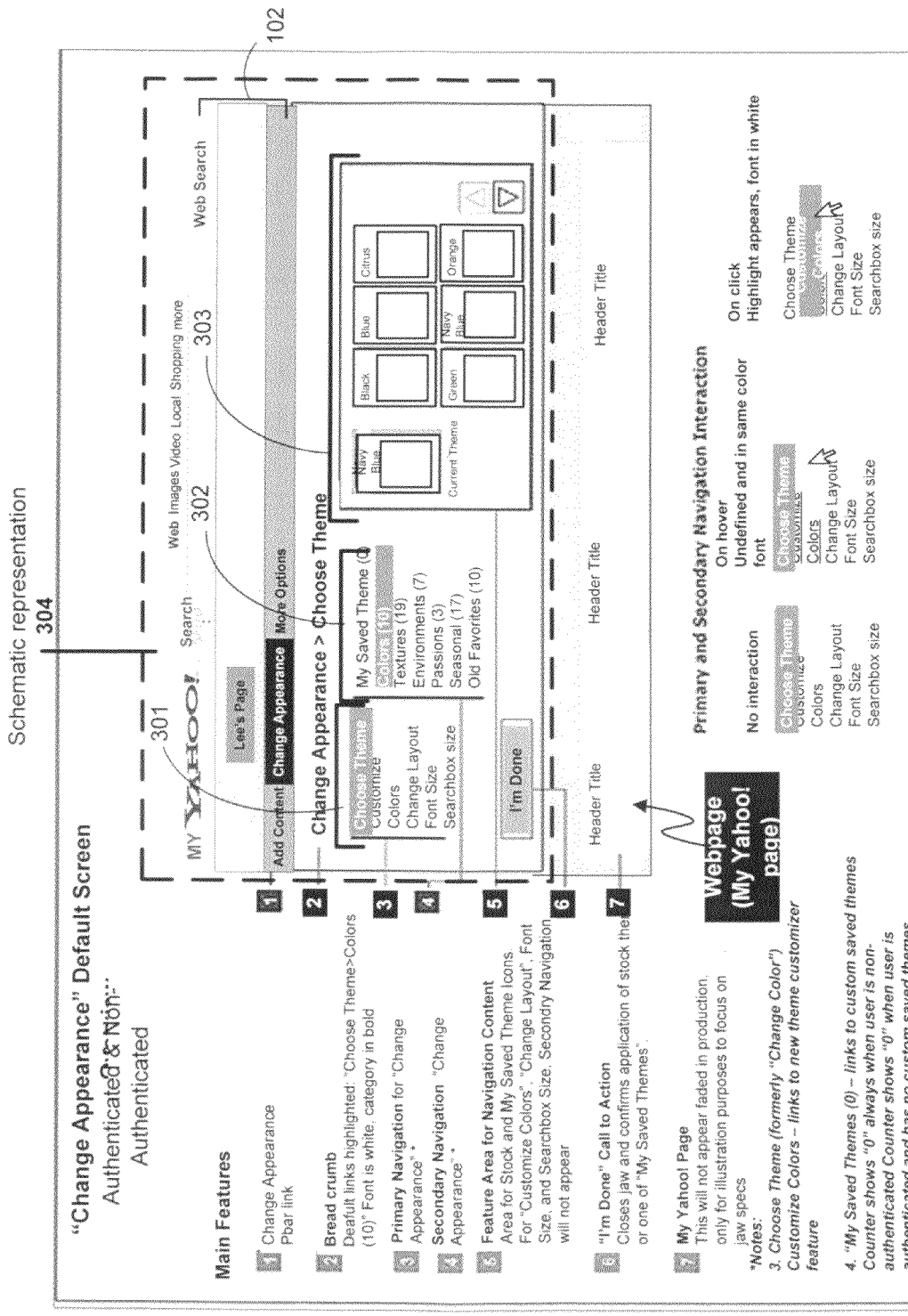
FIGS. 3A-3D illustrate some of the various features and options used during customization of the webpage, in one embodiment of the invention.
Figure 3B:
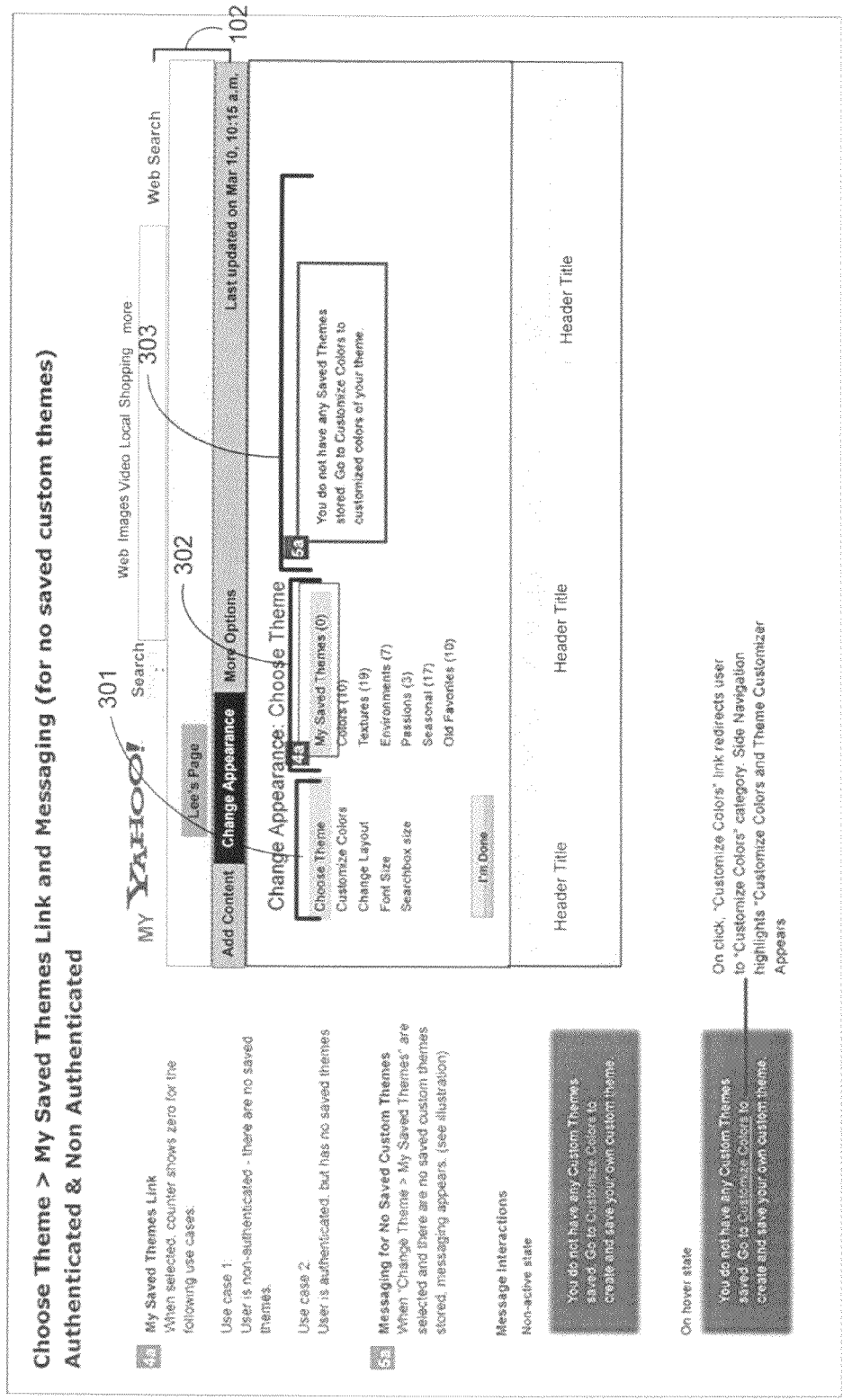

The SUI 222 provides a live, modeless update to the webpage and to the information related to the webpage that is stored in a back-end database by providing a plurality of features. FIGS. 3A-3D identify some of the features provided by the SUI 222 for customizing a webpage. Referring to FIG. 3A, the SUI module 222 generates and renders a primary navigation link list 301 that identifies various customization options that are available to a user for customizing the webpage. For each of the navigation links within the primary navigation link list 301, the SUI 222 provides one or more of an additional navigation link list, schematic diagram, a tool or a feature area with options. In one embodiment, the feature area may include a stock of existing available options to choose from and an option to generate a new option for a selected navigation link. For instance, in one embodiment, when a "Choose Theme" navigation link is selected from the primary navigation link list 301, a secondary navigation link list 302 identifying various secondary link options and a feature area 303 for rendering navigation content associated with the selected navigation link is presented, as illustrated in FIG. 3A. The navigation content may encompass a stock of existing themes.

The feature area 303 also includes an option to generate a customized theme for the selected navigation link specific to a user. The customized theme can be applied to the webpage as part of customization and may be added to the existing stock of theme options. In one embodiment, the secondary navigation link list includes a count corresponding to each secondary navigation link to indicate number of options available under that secondary navigation link option. For instance, a secondary navigation link of "Colors" on the secondary navigation link list 302 indicates that there are 10 options available under the selected secondary navigation link, as illustrated in FIG. 3A. In some cases, there may not be any options available under a selected secondary navigation link for a specific user, as illustrated by bubble 4a under "My Saved Theme" in FIG. 3B. This may be due to the user not having saved the customized theme or the user may be a non-authenticated user who is not allowed to generate a custom theme. As can be seen, various reasons may drive the generation, saving and rendering of various options for a given navigation link. When a navigation link with no available options is selected in the secondary navigation link list 302, appropriate interactive messages are generated and rendered by the SUI 222 in response to a user interaction during customization, as illustrated by bubble 5a in FIG. 3B.

Figure 3C:
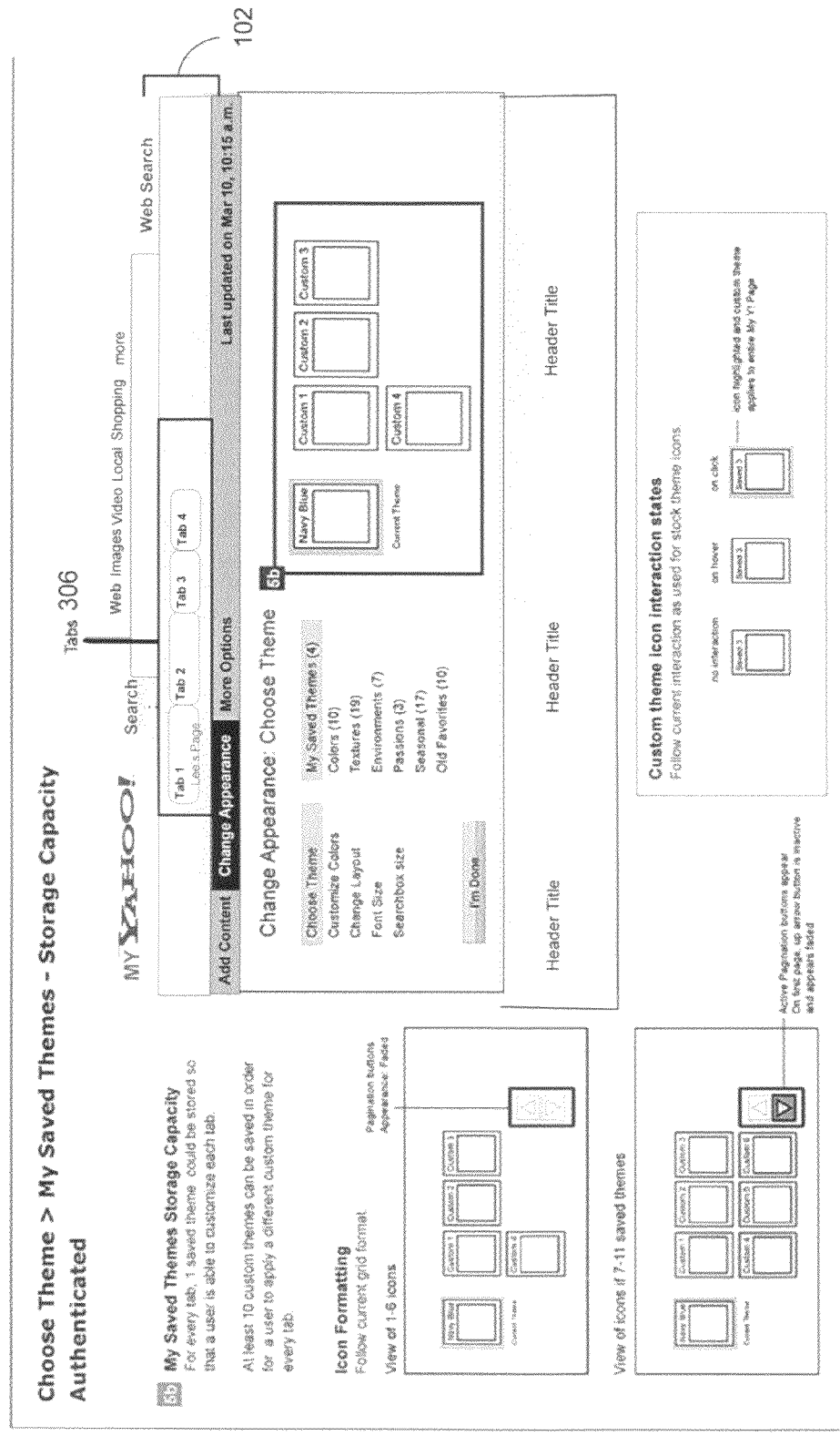

In an alternate embodiment, the options available under secondary navigation link list may also be provided in the form of one or more tabs 306 in the navigation bar section 102 (of FIG. 1), as illustrated in FIG. 3C. Each of the tabs 306 may be associated with a saved theme so that the user may be able to customize the themes using these tabs. As can be seen, the available navigation options for navigating through various section elements/navigation links can be presented in different ways so that customization of a webpage can be enabled.

Figure 3D:
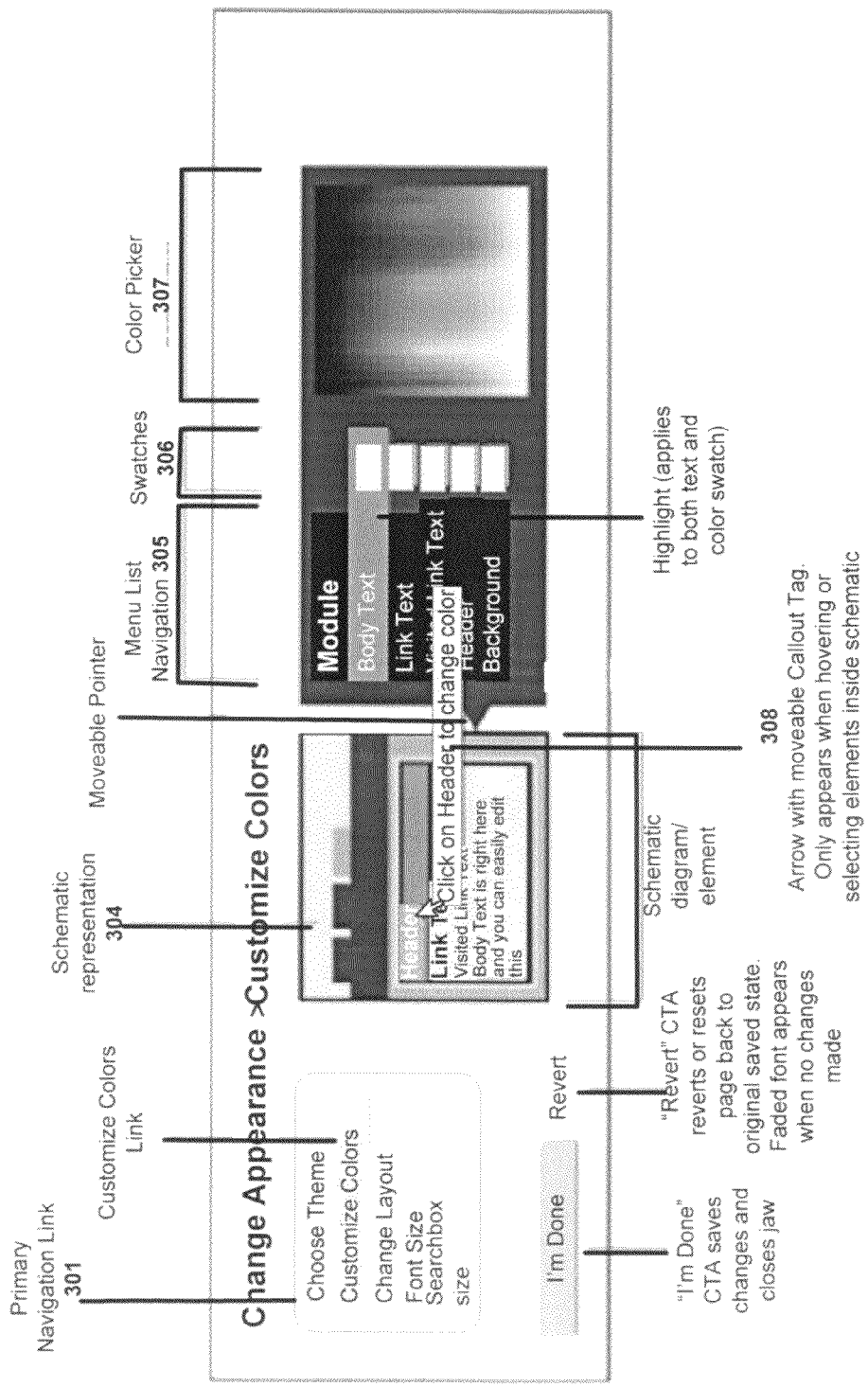

FIG. 3D illustrates some of the features provided by the SUI 222 when "Customize Colors" navigation link is chosen from the primary navigation link list 301, in one embodiment of the invention. As illustrated, when "Customize Colors" option is selected in the primary navigation link list 301, a schematic representation of the webpage, in the form of a schematic diagram 304, is rendered alongside the webpage. The schematic diagram 304 includes a plurality of schematic section elements that correspond to the section elements of the webpage. As was described earlier, each of the section elements includes a plurality of elements with each element defined by one or more attributes. The schematic diagram generated by the SUI 222 provides a visual navigation of customizable section elements of the webpage and is provided as a "clickable" schematic diagram. For instance, the schematic diagram allows for click navigation between various schematic section elements as well as direct access through clicks to individual schematic section elements that correspond to the section elements of the webpage.

In one embodiment, one of the schematic section elements is selected and highlighted by the SUI 222 as immediately editable by default upon the rendering of the schematic diagram 304. The highlighting provides for visual identification of the selected schematic section element. In addition to providing a clickable schematic diagram 304, the SUI 222 also provides one or more secondary navigation, such as menu list navigation 305, to aid in the customization. The menu list navigation 305 includes a plurality of elements corresponding to the highlighted schematic section element. In one embodiment, one of the elements in the menu list navigation 305 is selected as immediately customizable/editable by default upon rendering and highlighted to provide visual identification of the selected element. When a schematic section element of the schematic diagram 304 is selected for customization through user interaction, the menu list navigation 305 is updated by the SUI 222 to reflect one or more elements associated with the selected schematic section element. The SUI 222 highlights the selected schematic section element while updating the menu link navigation list with corresponding element list associated with the selected schematic section element. When a different schematic section element is chosen for customizing, the SUI 222 highlights the appropriate schematic section element and updates the element list in the menu list navigation to reflect the list of elements associated with the newly selected schematic section element.

In addition to menu list navigation, a color swatch 306 may also be rendered along with a customization tool, such as a color picker 307. The color swatch 306 includes a color chicklet for each of the elements in the menu list navigation 305 which identifies the current color selection of the corresponding element. In the embodiment described above, when a default element is highlighted as immediately editable, the corresponding color swatch is also highlighted. The color picker 307, in the form of a color palette, is provided for customizing the look and feel of the various elements on the schematic diagram and, consequently, on the webpage. An element within the menu list navigation for the selected schematic section element is selected either by default or by user interaction for customization. User interactions at the color palette are tracked for the selected element during customization. The selected element, the color swatch corresponding to the selected element are updated in real time and the corresponding element within the respective section element of the webpage is updated in substantial real time based on the user interaction, in one embodiment of the invention. For instance, if a user hovers over a color on the color palette for the selected element within a selected schematic section element, the color of the selected element and the corresponding color of the swatch chicklet in the schematic diagram are adjusted in real-time to reflect the color the user is hovering on. As the user hovers over different colors, the color in the corresponding schematic section element and the color swatch chicklet are updated to reflect the change in color.

Updating the color at the element in the schematic section element in real time while the user is hovering over the color enables the user to visualize the effect of the color choice prior to committing the change. The hovering action by a user, in one embodiment, indicates that the user is reflecting on the change and has not yet committed the change. When the user has decided that a particular color is the optimal color for the selected element within the schematic section element, and clicks on the color, the SUI 222 recognizes the user interaction at the schematic diagram and updates the color at the corresponding element in the schematic diagram and in the webpage. The change in color at the element in the webpage is also updated to a backend database (such as webpage database 250 of FIG. 2) that stores all the customizations so that the changes can be provided at subsequent rendering.

The SUI 222, thus, includes logic to determine user interaction at the schematic diagram during customization to determine the intention of the user and updates one or more attributes of the corresponding element/schematic section element accordingly. For instance, when a user hovers over a schematic section element, the SUI 222 recognizes the "on-hover" interaction and highlights the appropriate schematic section element. The embodiments are not restricted to using a color highlighting feature to provide a visual identification of the selected element but can use other forms of visual identification. When an element within the schematic section element is selected, the selected element and the corresponding color swatch are highlighted indicating the element selected for customization. Similarly, when the user hovers over a customization tool, such as a color palette, the SUI 222 recognizes the "on-hover" interaction of the cursor and updates the color of the selected element in the schematic section element at the schematic diagram in real time to visualize the color change brought about by the hovering cursor. In one embodiment, as the cursor hovers over an element, the SUI 222 will identify the element that the cursor is hovering over and provide a tooltip, a callout tag or other form of identifying tool, as illustrated by the tooltip 308 in FIG. 3D, to identify the element, so that the user can either confirm or cancel the customization for the selected element. In this embodiment, as the cursor moves out of the schematic diagram region, the tooltip disappears.

Along similar lines, when a user clicks on a schematic section element showing his/her intention to change one or more attributes of the schematic section element, the SUI 222 recognizes the "on-click" interaction and updates the menu list navigation for the selected schematic section element. One of the elements in the menu list navigation is highlighted indicating that the element is immediately updateable.

A pointer tool, such as an arrow, may be used in the menu list navigation to identify the selected schematic section element in the schematic diagram, in one embodiment of the invention. The pointer tool is exemplary and should not be considered restrictive. Other forms of pointer tools or identification tools may be used to identify the selected schematic section element. The arrow moves based on the selection of the appropriate schematic section element in the schematic diagram. A callout tag, a tool tip or any other form of identification tags may be used to provide identification of the selected schematic section element. These tags may be helpful to a novice user to help identify the various elements/schematic section elements while navigating through the schematic diagram during customization. One or more call-to-action (CTA) options may be provided to indicate if the changes need to be committed or reversed. In one embodiment, the CTA options are provided as buttons, such as "I'm Done" and "Revert" buttons. The CTA options are exemplary and are not restrictive. As such, the CTA options may be provided in any other forms so long as the functionality of the options is maintained.

Additional navigation links are available in the primary navigation link list 301 to further customize various features of the webpage. In one embodiment, the additional navigation links include, "Change Layout" to change the layout of the content modules in the webpage, "Set Font Size" to change the size of the text font within the webpage and "Set Searchbox Size" to change the size of the search box on the webpage. These options are exemplary and should not be considered restrictive. Other options may be provided based on the level of customization desired and enabled. Each of the options, as mentioned earlier, provide one or more additional options, links or customization tools to customize the look and feel of the webpage.

Figure 4:
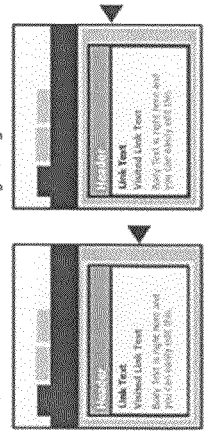
FIG. 4 illustrates various menu list navigations during schematic interactions at various schematic section elements, in one embodiment of the invention.
Figure 4:
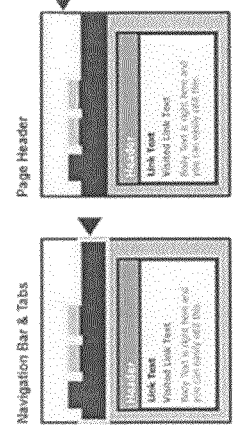

FIG. 4 illustrates a sampling of menu list navigation corresponding to the schematic elements selected during customization, in one embodiment of the invention. The menu list navigation identifying the various elements is exemplary and should not be considered restrictive. Other elements may be associated with each schematic section element and may be considered in the menu list navigation. As illustrated in the table on FIG. 4, when a content module is selected, the corresponding elements that may be available as options in the menu list navigation for customization may include Body Text, Link Text, Visited Link Text, Module Header and Module Background. Each of the elements may include a plurality of attributes that are customizable. Thus, Body Text element may include attributes, such as color of the text, font size and font style. Similarly, Header element may include header text style, header text color, header text size and header background color attributes. SUI 222 identifies each of the elements and provides tools to customize one or more attributes of each of the elements during customization.

Referring back to FIG. 2, the customizer logic 224 within the theme builder algorithm 220 provides customization tools to customize one or more element within a schematic section element in the schematic diagram generated by the SUI 222 that cascades to the corresponding elements within the relevant section elements of the webpage. The customizer logic 224 allows customizing of specific look and feel of all graphic and text elements of a webpage. The customizer logic 224 includes a color picker module 224-*a*, an image picker module 224-*b* and a colorizing algorithm 224-*c*.

The color picker 224-*a* enables customization of colors for the various elements of the webpage by providing a color palette. An element within a schematic section element at the schematic diagram is identified for customization. The customizer logic 224 works alongside the SUI 222 to to identify the color of the identified element within the schematic section element at the schematic diagram using the color palette.

The webpage may be generated locally or may be obtained from an external source. When the webpage is obtained from an external source, the color associated with each element in the webpage may or may not match the colors within the color palette. In the instance when the color does not match the colors within the color palette (meaning the color has an out-of-range value), the color picker 224-*a* includes logic to identify a color within the color palette that is closest to the color of the selected element of the schematic section element. Upon identification of the color associated with the element, the color picker 224-*a* positions a marker, such as a black-and-white marker or any other color, to highlight the identified color on the color palette to indicate the previous selected color for the element. During customization, the color picker 224-*a* tracks the user interaction at the color palette and interactively updates the marker accordingly. The cursor works independently of the marker. Towards this end, when the cursor is on-hover, the color picker 224-*a* maintains the position of the marker at the previously selected color while the SUI 222 updates the element color along with the related swatch to reflect the color over which the cursor is hovering. When the cursor is on-click indicating the color is selected for the element, the marker is re-positioned to the selected color location to indicate the new color associated with the element. This positioning of the marker is used by the SUI 222 to update the color attribute of the selected element in the schematic diagram in real time and the webpage in substantial real-time.

Figure 5A:
FIGS. 5A and 5B illustrate the various interactions performed during customization of a webpage using images, in one embodiment of the invention.
Figure 5B:
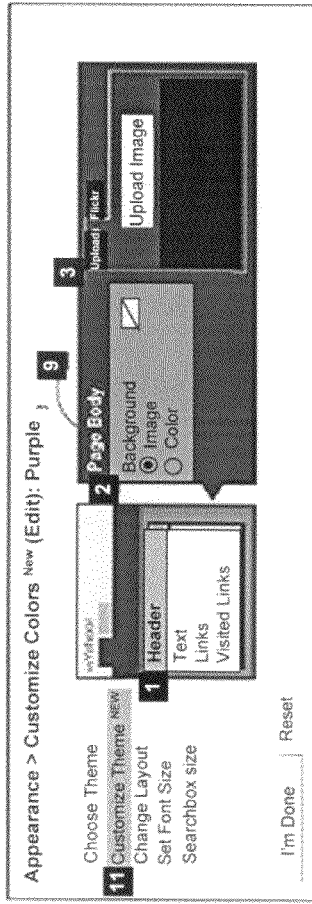

Aside from color customization using a color palette, the customizer logic also provides an image-picker module 224-*to* enable a user to customize the webpage with selected images. The image-picker module 224-*b* works similar to the color-picker module 224-*a*. An overview of the selection and application of image to an element of the webpage using the image-picker module 224-*b* is illustrated in FIGS. 5A and 5B. Similar to the color-picker module 224-*a*, the image picker module 224-*b* works alongside the SUI 222 to select, customize and apply an image to an element or section element of the webpage. The SUI 222 is used to select an element associated with a schematic section element for customization. As illustrated in FIG. 5A, a schematic diagram identifying the schematic section elements that make up the webpage is used for customizing the webpage. The SUI 222 highlights a schematic section element selected for customization. As illustrated by bubble 1, a "Page Body" schematic section element is chosen for customization. Upon selection of a schematic section element, the SUI 222 generates menu list navigation identifying the elements associated with the selected schematic element, page body. An element, such as "Background", is selected from the menu list navigation for customization, as illustrated by bubble 2. When the element is selected, the SUI 222 identifies one or more attributes associated with the selected element that can be customized.

In the embodiment illustrated in FIG. 5A, the attributes that are customizable for the page body's background element include color and image. In addition to the attributes, a color swatch similar to the color swatch illustrated in FIG. 2, may be rendered alongside the attributes to indicate the current color scheme available for the selected element. When the color attribute is chosen, the color picker module 224-*a* is activated and a color palette is rendered alongside to select a different color for the element. When the image attribute is selected, the image-picker module 224-*b* is activated. One or more tabs are rendered, in one embodiment, for selecting and applying an image. In one embodiment, the tabs include an upload tab and a flicker tab. The tab options illustrated in FIG. 5A are exemplary and should not be considered restrictive. When the upload tab is selected an image may be uploaded from a user's own computer, as illustrated by bubble 3 in FIG. 5A, in one embodiment of the invention. Alternatively, when the flicker tab is selected, an area, similar to a feature area illustrated in FIG. 2 is rendered for displaying images from one or more applications, such as Flickr™ application, etc., or from a URL, as shown by bubble 5. Optionally, a pull-down menu option, as illustrated by bubble 6, may be provided by the image-picker module 224-*b* to select an application or location from which one or more images may be chosen for rendering in the area prior to selecting an image for applying to the element. Upon selecting the application or location, thumbnails of images are rendered in the area so that the image-picker module 224-*b* may select an image for applying to the selected element. In one embodiment, a pre-determined number of images may be rendered in the area at a given time. When more than the pre-determined number of images are available for rendering in the area, the images may be rendered in multiple pages and appropriate links provided to access the images. In the embodiment illustrated by bubble 8 in FIG. 5B, a pagination concept is used for rendering and accessing the appropriate images. The pagination concept is exemplary and other forms of accessing multiple images, such as scrolling, etc., may be used without departing from the scope of the invention.

An image is selected from the area through user interaction and applied to the selected element. The applied image is rendered immediately on the selected element in the schematic diagram and upon confirmation through additional user interactions applied to the corresponding element in the webpage in substantial real time. The image may be further customized to change the color or other attributes using the customization tools, such as color picker, etc., available prior to or after applying the image to the selected element. The customization to the image is rendered at the schematic diagram in real time and at the webpage in substantial real-time based on the user interaction. Additionally, the image-picker module 224-*b* works with the SUI 222 to update the changes to a backend database for the corresponding webpage so that the webpage with the customization may be shared with other users.

The webpage database or backend database is updated by capturing the changes to one or more attributes associated with the one or more elements of the webpage due to customization and generating a combined list by combining a complete list of attributes of the plurality of elements that define the webpage with the list of elements whose attributes were changed due to customization. The complete list of attributes of the plurality of elements includes attributes that do not have any customization, however, the combined list of elements will include the customized attributes of one or more elements. The combined list of attributes is used to generate an updated style form, such as a cascading style sheet (CSS) form, for the webpage and update the code defining the webpage. The resulting webpage includes the customized changes to one or more elements. The newly generated CSS may be shared with other users through import, export, transfer or sharing of actual code that defines the webpage. Additionally, the webpage may be uploaded to a computer system, such as a server, and access to other users may be provided through a Uniform Resource Locator (URL) link to the webpage on the server.

In addition to the color-picker and image-picker modules 224-*a*, 224-*b*, the customizer logic 224 includes a colorizing algorithm 224-*c*. The colorizing algorithm includes a one-to-many colorizing logic. The colorizing algorithm 224-*c* works in conjunction with the SUI 222 to provide a customized webpage that is shared with other users. Towards this end, a color theme is generated for a webpage by selecting a schematic section element and applying a color from the color palette. The one-to-many algorithm within the colorizing algorithm uses the selected color for an element within schematic section element and applies related harmonious colors to multiple affected elements within the selected schematic section element based on the single color choice. Thus, a selection of hues, saturations, and values based on the color selected for the selected schematic section element are used to style all the related elements associated with the selected schematic section element so as to generate a visually contrasting palette that maintains readability. Accordingly, if a background element of a header schematic section element is selected to be a dark color during customization, a set of coordinating colors selected color of the background element is selected and applied to other related elements within the header schematic section element so that the text, graphics and other features are clearly distinguishable. Some of the related elements for the header schematic section element may include a header text, body text, link text, background image, etc. Thus, the colorizing algorithm provides a unique set of tools that uses a color selected for one element to apply coordinated colors to multiple related elements so as to provide a visual contrasted palette thus enabling a user to do multiple element customization using single element customization.

When the previous color applied to an element is an out-of-range value, then the colorizing algorithm identifies a color that is closest to the out-of-range value. The color of the element may then be customized using the one-to-many algorithm, which would result in the selected element and all the related elements being customized based on a newly selected color for the element.

The colorizing algorithm includes a cascading style sheet (CSS) generating algorithm to update the style list of the webpage. The list of elements with customization is used to update the style list of the webpage. As explained in an earlier section, this list of customized elements may not be a complete list. Thus, in order to update a style list of the webpage with the customizations to one or more elements, a complete list of elements is obtained from a given predefined style list and is combined with the customized element list so that any undefined elements in the customized element list are defined by the complete list. The combined list is saved in a backend database, such as webpage database illustrated in FIG. 2, under a corresponding user ID as a customized color theme so that subsequent rendering and sharing is enabled.

Figure 6:
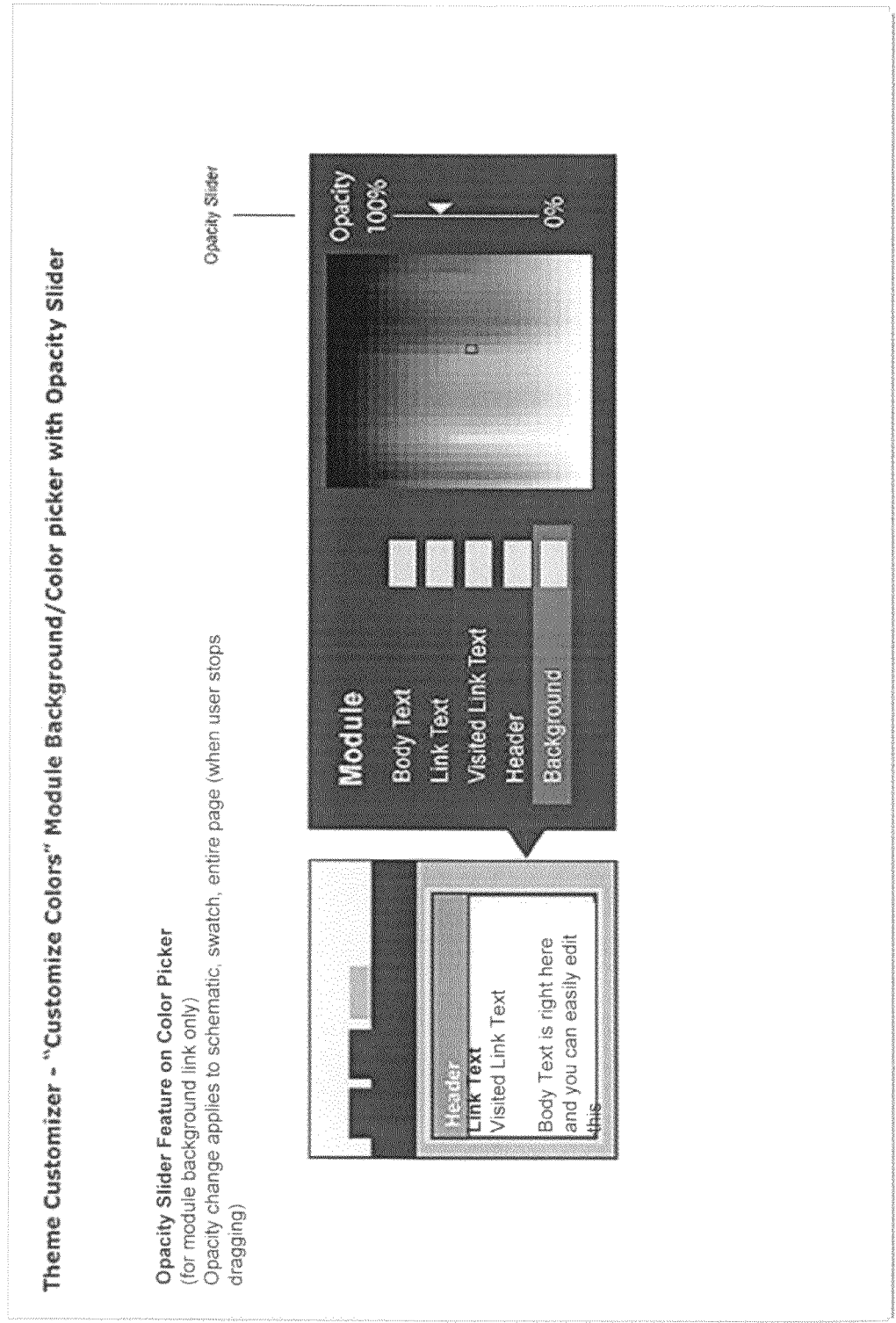
FIG. 6 illustrates a sample color selection tool with Opacity slider to control transparency attribute of certain elements of the webpage, in one embodiment of the invention.

The customizer logic includes logic to enable transparency feature to one or more elements of the webpage, in one embodiment of the invention. In this embodiment, an element of a schematic diagram may be transparency enabled so that features that are behind the element may be visible. For instance, a webpage may be customized to include an image in a page background. The image within the page background may have its own transparency features. A background element of a content module section element within the page section element may be transparency enabled during customization such that the page background element with the customized image may be visible through the content module. In this embodiment, the transparency feature within the image will be maintained. The customizer logic may include an opacity slider feature to control the level of opacity through user interaction, as illustrated in FIG. 6. As the opacity level changes the level of transparency changes accordingly. The transparency feature is applied to the selected element, the corresponding swatch at the schematic diagram in real time and upon commitment to the corresponding element in the webpage in substantial real time based on user interaction.

The OAPI logic available at the server enables sharing of customized webpage. The OAPI provides the logic to transfer/share/export the personalized webpage settings over the network. The OAPI also enables an externally created custom "open" theme to be shared/imported to a product via URL and saved under custom category of themes. The OAPI enables such sharing by creating a unified source for all attributes related to visual style on the page. The backward compatibility of theme files allows for themes to remain intact and not break as page changes.

Figure 7:
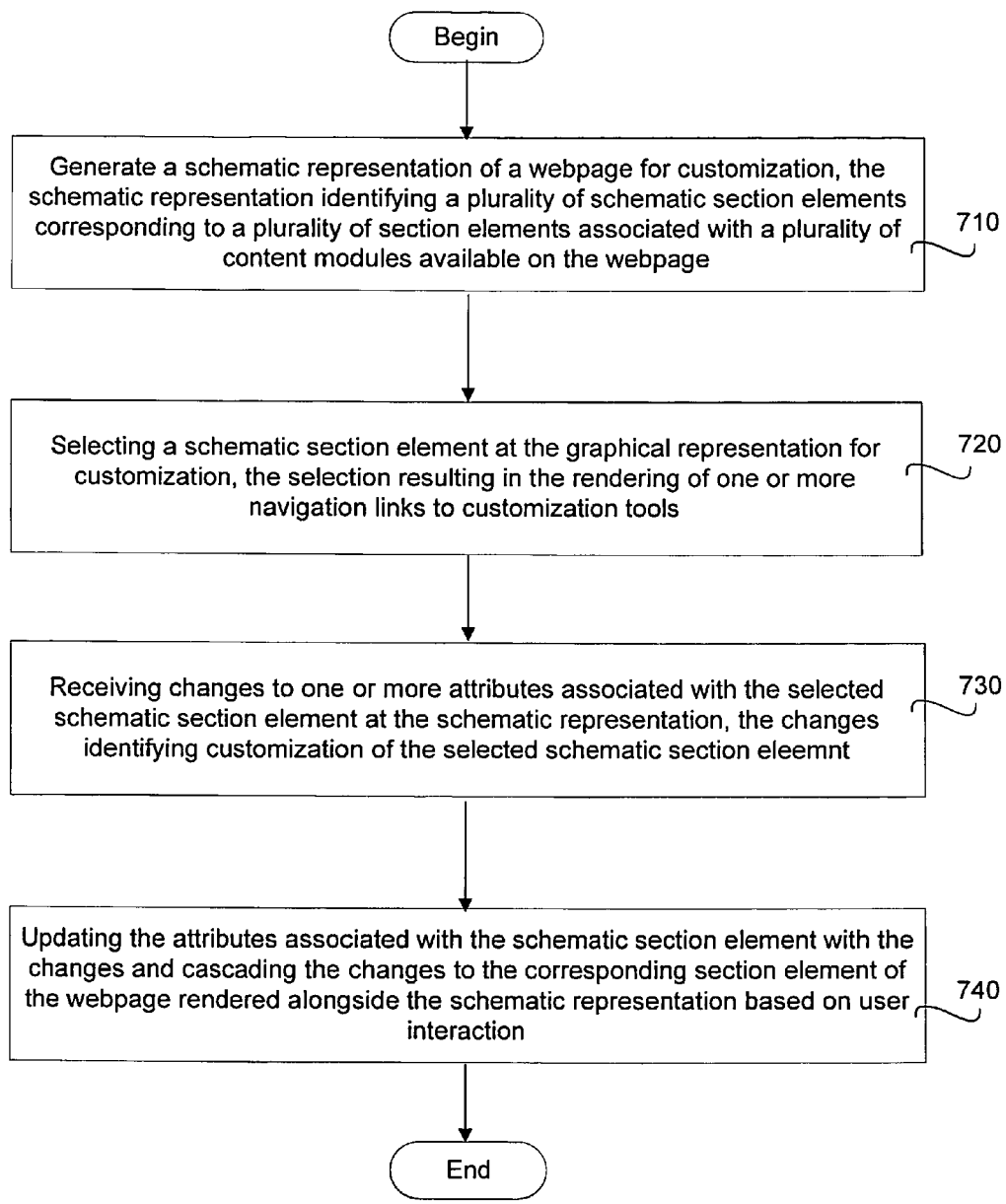
FIG. 7 illustrates a flowchart of process operations involved in customizing a webpage, in one embodiment of the invention.

With the above general understanding of the algorithm, a method for customizing a webpage will now be described with reference to FIG. 7. The method begins at operation 710 wherein a schematic representation of a webpage is generated for customization and rendered alongside a webpage. The webpage includes a plurality of section elements with each section element having a plurality of elements. Each of the elements are defined by one or more attributes. When a user desires to customize a webpage, a schematic user interface available at a server generates a schematic representation of the webpage, in the form of a schematic diagram. The schematic diagram identifies a plurality of schematic section elements that correspond to the plurality of section elements of the webpage. The schematic diagram provides visual navigation through the section elements of the webpage.

A schematic section element is selected from the plurality of schematic section elements for customization, as illustrated in operation 720. To begin with, a primary navigation link list is provided alongside the webpage identifying a plurality of navigation options available for customizing the webpage. When a navigation link is clicked, one or more of a schematic diagram, a secondary navigation link list or additional options is provided. The schematic section element may be selected by clicking on the element within the schematic diagram rendered alongside the webpage or by clicking on a corresponding secondary navigation link option. Upon the selection of the schematic section element, one or more navigation links associated with the selected schematic section element are rendered alongside the schematic diagram. The navigation links provide one or more of additional navigation link lists identifying one or more elements, customization tools or options associated with the selected schematic section element to assist in the customization. The navigation links are secondary navigation links that aid in the customization of the various components of the webpage.

An element or a navigation link is selected from the secondary navigation link list for customization and one or more attributes associated with the selected element are modified to reflect the customization. The changes to the one or more attributes are received, as illustrated in operation 730. The attributes are then updated to the corresponding element within the associated schematic section element in real time, as illustrated in operation 740. The changes are cascaded to the corresponding elements in the webpage in substantial real time based on user interaction, such as "on-click". The changes that cascade to the webpage are also captured and used to update the attributes and style list at the backend database for subsequent rendering. The updated webpage in the database is saved using corresponding user identification (ID) and can be recalled by the user and shared with other users. By saving the customized webpage under a specific user ID, the original webpage and the customized webpage can both be accessed simultaneously.

The customized webpage can be shared with other users in at least one of two ways. In one embodiment, the newly customized webpage may be inclusively shared with another user by sending the webpage content and the associated theme under which the customization is saved, to the user for rendering at the user's computer system. In another embodiment, sharing is enabled by exporting the content and associated theme into a file and placing the file on the internet. A URL link is provided so that other users can gain access to the customized webpage. When the users click on the URL link, they will be directed to the customized webpage at the original user's system. Other users may further customize the webpage and the customized webpage can be shared with other users in the manner described herein. In the aforementioned embodiment, the customization is updated to the code describing the webpage indirectly through the theme-builder algorithm.

In an alternate embodiment, a code associated with the webpage, such as an extensible markup language (XML) file, defining the webpage may be imported into the system and the webpage customized. The customization may be performed by either directly manipulating the code defining the webpage, such as the XML code, or may be performed using the SUI. The customized webpage is then shared with other users through the sharing of the code or through the URL link.

The SUI provides a novice user with powerful customization features that are normally available to power users who have access to code. The webpage with a custom theme may be imported using the XML file, customized using the SUI and exported back as an XML file. The original XML file will have all the details associated with the presentation of the contents and the SUI will provide additional interface to customize the remaining portions of the webpage defined by the XML file. The customization provided by the SUI is directly updated to the XML file so that when the XML file is exported back, the XML file will have all the details including the customization provided at the webpage.

Thus, the theme builder algorithm is optimized for both lightweight personalization and for power users who want to completely customize each element of their webpage and build their own application to execute and apply the change. The algorithm enables saving of such customizations in an open stock theme that can be shared with other users through exporting, importing, transfer to other webpages and software products. The application generates and renders a schematic diagram of the webpage alongside the webpage that act as a visual model for visualizing the customization prior to committing the changes. The algorithm enables cascading customization performed at an element of a schematic diagram to all the relevant elements of the webpage simultaneously. Further, the algorithm provides coordinating customization of a plurality of related elements based on customization of a single element. These and other features make the algorithm unique.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing customization of a webpage, comprising:
   generating a schematic representation of the webpage, the schematic representation defining a plurality of schematic section elements corresponding to a plurality of section elements of the webpage that has already been created, the schematic representation providing a minimap interface mapping the schematic section elements with corresponding section elements of the webpage that are customizable, the minimap interface providing visual navigation through the plurality of section elements of the webpage;
   receiving a selection of a schematic section element from the plurality of schematic section elements in the schematic representation for customizing at the minimap interface, the selection of the schematic section element triggering rendering of one or more navigation link lists at the minimap interface enabling customization of the selected schematic section element, the navigation link list returned for rendering being specific for the selected schematic section element;
   receiving changes to one or more attributes defining the selected schematic section element at the minimap interface for the schematic representation of the webpage, the changes identifying customization to the selected schematic section element; and
   updating the attributes of the selected schematic section element at the schematic representation in real time to reflect the changes, the updating of the attributes providing a visualization of the changes to the selected schematic section element at the schematic representation and allowing cascading of the changes to corresponding section elements of the webpage, the cascading includes automatic updating of code defining the webpage with the updated attributes;
wherein the customization acts to change look and feel of the webpage.

2. The method of claim 1, further includes storing the one or more attributes associated with customization of the one or more of the plurality of schematic section elements for subsequent retrieval and rendering.

3. The method of claim 1, wherein rendering one or more navigation links further includes,
   identifying one or more of customization options or related elements associated with the identified schematic section element;
   generating a navigation link list with the identified customization options and related elements, the navigation links within the navigation link list enabling customization of the selected schematic section element; and
   presenting the navigation link list at the minimap interface of the schematic representation.

4. The method of claim 1, wherein cascading the changes further includes,
   modifying one or more attributes of a corresponding section element of the webpage to reflect the customization at the schematic section element in substantial real time based on user interaction at the schematic representation.

5. The method of claim 4, wherein modifying section element further includes updating code and style form defining the webpage to reflect the changes to the section element, the modified code and style form used for subsequent retrieval.

6. The method of claim 1, wherein receiving changes includes receiving changes to a color scheme applied to the schematic section element at the minimap interface of the schematic representation, wherein receiving changes to a color scheme includes,
   presenting, at the minimap interface, a color scheme for selection that is distinctly different from the color scheme applied at the selected schematic section element; and
   applying the color scheme selected at the minimap interface, to the selected schematic section element, the application of the selected color scheme triggering automatic application of harmonious colors corresponding to the selected color scheme to related one or more elements associated with the selected schematic section element, the application of harmonious colors providing a visually contrasted palette.

7. The method of claim 6, wherein the application of harmonious colors to the related elements is performed in substantial real time.

8. The method of claim 6, wherein the selection of the color scheme further includes
identifying the color scheme that is nearest to the color scheme provided at the selected schematic section element when the color of the selected schematic section element is an out-of-range color value; and
presenting, at the minimap interface, the color scheme that is distinctly different from the identified color scheme for selection and application to the selected schematic section element during customization.

9. The method of claim 1, wherein the customization includes selecting and applying an image to the schematic section element within the schematic representation of the webpage using the minimap interface.

10. The method of claim 9, wherein the application of the image further includes,
applying the selected image to the selected schematic section element using the minimap interface such that a plurality of image attributes defining the image is retained; and
cascading the application of the image to the corresponding section element of the webpage.

11. The method of claim 10, wherein application of the image further includes providing transparency feature to each of the section element that form the webpage such that the image is visible through each of the section element.

12. The method of claim 10, wherein the cascading further includes,
receiving a list of one or more attributes of the customized section element at the minimap interface, the attributes reflecting the customization;
generating a combined list of section elements by combining the list of attributes of the selected section element with a complete list of attributes of the plurality of section elements that define the webpage, the complete list of section elements including section elements without any customization; and
applying the combined list having the customized attributes to the webpage, the application of the combined list automatically updating style form and code that define the webpage,
wherein the complete list is predefined.

13. The method of claim 12, wherein applying the combined list further includes generating a new cascading style sheet (CSS) form using the combined list of section elements including attributes associated with the customized section element of the webpage.

14. The method of claim 1, wherein the webpage is defined through code or obtained from an external source, the webpage including attributes defining content and style of the plurality of section elements.

15. The method of claim 12, further includes distributing the customization of the webpage to other users, the distribution carried by one of sharing, importing or exporting of the code defining the webpage.

16. A theme-builder algorithm provided within a non-transitory computer readable medium that is configured to execute on a computing system server, the theme-builder algorithm having code which when executed by the server allows for customizing a webpage, the algorithm comprising:
a schematic user interface to generate a schematic representation of the webpage, the webpage includes a plurality of section elements, the schematic representation identifying a plurality of schematic section elements corresponding to the plurality of section elements of the webpage that has already been created, the schematic representation providing a minimap interface mapping the schematic section elements with corresponding section elements of the webpage that are customizable, the minimap interface providing visual navigation through the plurality of section elements of the webpage;
a customizer logic for customizing selected one or more of the plurality of schematic section elements at the schematic representation by manipulating one or more attributes that define the selected schematic section elements at the minimap interface, the selection of the one or more schematic section elements triggering rendering of one or more navigation link lists specific to the selected schematic section element at the minimap interface, the customization cascading to corresponding one or more section elements of the webpage and for storing a list of section elements with the customization, the customizer logic is configured to automatically update code defining the webpage with the updated attributes identified during customization, wherein the customization acts to change look and feel of the webpage; and
an open application programming interface (OAPI) for allowing sharing of the customized webpage with other users.

17. The theme-builder algorithm of claim 16, wherein the customizer logic further includes,
a color picker algorithm for selection and application of a color scheme to a schematic section element of the schematic representation and for cascading the selected color scheme to the section element of the webpage during customization, the color picker algorithm having logic to,
identify current color scheme associated with the schematic section element at the minimap interface;
apply a color scheme distinctly different from the current color scheme to the schematic section element and corresponding section element of the webpage based on user interaction at the minimap interface, the application of the color scheme at the schematic representation and the webpage performed in substantial real time; and
an image picker algorithm for selecting and applying an image to a schematic section element at the schematic representation using the minimap interface and a corresponding section element at the webpage, the image picker identifying and retaining one or more image attributes during application.

18. The theme-builder algorithm of claim 17, wherein the customizer logic further includes
a colorizing algorithm,
to apply harmonious colors to plurality of elements related to the schematic section element at the minimap interface based on a color choice for the schematic section element; and
to identify and apply a color available within the color palette that is nearest to a pre-assigned out-of-range color value associated with the schematic section element.

19. The theme-builder algorithm of claim 16, further includes a CSS-generating algorithm to,
generate a new style sheet for the webpage, the new style sheet generated by combining the stored list of section elements with customization with a complete list of section elements that defines the webpage prior to customization; and create a new style sheet for the webpage with the combined list of section elements, the new style sheet including the customization of the one or more section elements of the webpage.

20. A method for providing customization of a webpage, comprising:

rendering a navigation link list with a plurality of navigation links at a schematic representation that includes a minimap interface for the webpage that has already been created, the webpage including a plurality of section elements with each section element having a plurality of elements defined by a plurality of attributes, the minimap interface mapping the section elements of the webpage that are customizable with schematic section elements of the schematic representation, the navigation link of the schematic representation providing navigation to one or more tools and options that aid in the customization of the webpage by modifying one or more of the plurality of attributes of the one or more of the plurality of elements of the webpage, selecting a navigation link from the navigation link list at the minimap interface, the selection of the navigation link triggering rendering of one or more of a plurality of options, tools, additional navigation links associated with the selected navigation link at the minimap interface to enable modifying one or more attributes associated with an element defining the webpage during customization; and receiving modifications to one or more attributes associated with the element of the webpage as part of customization through one of the plurality of options, tools or additional navigation links at the minimap interface and cascading the modifications to related elements of the webpage in substantial real time based on user interaction, wherein the cascading includes automatic updating of code defining the webpage with the modified attributes, wherein the customization acts to change look and feel of the webpage.

21. The method of claim 20, wherein the schematic representation provides visual navigation through the plurality of section elements of the webpage at the minimap interface.

22. The method of claim 20, receiving modifications to one or more attributes further includes, selecting a schematic section element from the plurality of schematic section elements at the minimap interface for customizing, the selection of the schematic section element triggering rendering of one or more navigation links at the minimap interface enabling customization of the selected schematic section element;

receiving changes to one or more attributes associated with the selected schematic section element at the minimap interface of the schematic representation of the webpage, the changes identifying customization to the selected schematic section element; and updating the attributes of the selected schematic section element with the changes at the schematic representation in real time, the updating of the attributes triggering cascading of the changes to relevant section elements of the webpage based on user interaction.

\* \* \* \* \*